United States Patent
Horneman et al.

(10) Patent No.: US 6,560,460 B1
(45) Date of Patent: May 6, 2003

(54) DETERMINING GRADE OF SERVICE AND MOBILE TELEPHONE SYSTEM

(75) Inventors: Kari Horneman, Oulu (FI); Sami Jokinen, Oulu (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/269,226

(22) PCT Filed: Sep. 23, 1997

(86) PCT No.: PCT/FI97/00570
§ 371 (c)(1),
(2), (4) Date: May 17, 1999

(87) PCT Pub. No.: WO98/14020
PCT Pub. Date: Apr. 2, 1998

(30) Foreign Application Priority Data

Sep. 24, 1996  (FI) .................................................. 963814

(51) Int. Cl.[7] ................................................. H04Q 7/20
(52) U.S. Cl. ........................ 455/452; 455/453; 370/329
(58) Field of Search ................................. 455/414, 450, 455/452, 552, 553, 426, 453; 370/328, 338, 465, 468, 329

(56) References Cited

U.S. PATENT DOCUMENTS

| 5,442,625 A | | 8/1995 | Gitlin et al. |
| 5,497,504 A | | 3/1996 | Acampora et al. |
| 5,724,659 A | * | 3/1998 | Daniel .......................... 455/452 |
| 6,122,291 A | * | 9/2000 | Robinson et al. ........... 455/452 |

FOREIGN PATENT DOCUMENTS

| EP | 0719062 | 12/1995 |
| WO | 96/10875 | 4/1996 |
| WO | WO 96/10875 | 4/1996 |

* cited by examiner

Primary Examiner—Vivian Chin
Assistant Examiner—James K Moore
(74) Attorney, Agent, or Firm—Pillsbury Winthrop LLP

(57) ABSTRACT

A method of determining a grade of service provided for a mobile station by a mobile telephone system including a network part, a mobile station and a bi-directional radio link between the network part and the mobile station. The method comprises the network part assigning a service class for the mobile station based on a grade of service guaranteed by the mobile telephone system to the mobile station and conditions of the mobile telephone system. The conditions comprise transmission capacity and at least one other preselected variable representing features of the mobile telephone system and its use.

32 Claims, 4 Drawing Sheets

DETERMINING GRADE OF SERVICE AND MOBILE TELEPHONE SYSTEM

FIELD OF THE INVENTION

The invention relates to a method of determining the grade of service provided for a user of a mobile station by a mobile telephone system, comprising a network part, mobile station and bidirectional radio link between the network part and mobile station, and said grade of service comprising service classes.

BACKGROUND OF THE INVENTION

In mobile telephone systems of the prior art the user employs a mobile station in order to transmit speech or data over a radio link. The network part does not in any way optimize the capacity use of the transmission connections it utilizes depending on whether the radio link is used for speech or data transmission. In principle, the same grade of service is provided for all users. This results in waste of capacity in the network part. Furthermore, with the present mobile telephone systems it is not possible to price services differently according to the used grade of service.

With respect to further development of the present GSM/DCS 1800 system and the UMTS system under development as well as with respect to other future mobile telephone systems it is essential that in addition to speech and data, data requiring a greater transmission capacity, e.g. moving video pictures, can also be transmitted in them. Such an advanced mobile telephone system cannot be constructed according to the principles of the present systems, i.e. so as to provide all users with the same grade of service. This would be very expensive, since the transmission capacity of the network part would have to be defined according to the service requiring the greatest amount of transmission capacity, e.g. according to the capacity required for transmitting moving video pictures.

Advanced mobile telephone systems require introduction of different methods which enable efficient and optimal use of the transmission capacity in each specific case. It must be possible to optimize the methods, and they also have to be cost-effective and provide network operators with flexibility for managing different load situations of the network part.

BRIEF DESCRIPTION OF THE INVENTION

The object of the present invention is to eliminate the drawbacks of the prior art solutions.

This is achieved with the method set forth in the introduction, characterized in that each user is assigned a service class according to the grade of service guaranteed by the mobile telephone system to a user of a mobile station on the basis of the conditions of the mobile telephone system.

The invention also relates to a mobile telephone system comprising a network part, mobile station and bidirectional radio link between the network part and mobile station, the grade of service comprising service classes, characterized in that each user is assigned a service class according to the grade of service guaranteed by the mobile telephone system to a user of a mobile station on the basis of the conditions of the mobile telephone system, and in that the network part is arranged to carry out the processing of parameters that is needed for determining the grade of service, said parameters being preselected variables representing features of the mobile telephone system and its use.

The invention further relates to a mobile telephone system comprising a network part, mobile station and bidirectional radio link between the network part and mobile station, the grade of service comprising service classes, characterized in that each user is assigned a service class according to the grade of service guaranteed by the mobile telephone system to a user of a mobile station on the basis of the conditions of the mobile telephone system, and in that the mobile station is arranged to receive the grade of service from the network part.

The method of the invention has several advantages. One of the greatest advantages is that the use of the network part is optimized according to the service class employed by the user. As a result of this, it is possible to save on costs considerably in the construction of the network part, since it is not necessary to reserve extra capacity, but the amount of capacity can be defined according to the real use. To a mobile station user the invention means increase in the quality of services, e.g. call set-up is more reliable than in the prior art. It is also possible to provide new services, e.g. transmission of moving video pictures, for the user cost-effectively, even economically. On the other hand, the user is charged on the basis of the service class he employs, whereby the user, if he so desires, can select the service class that is most suitable and economical for him. The service class employed by the user is clearly indicated by his mobile station. The user also receives other useful information on the service class in use, e.g. the transmission speed. By utilizing the present method the network operator can flexibly control the use of the network part so as to optimize the costs arising from its use and the quality of the services provided for the user.

BRIEF DESCRIPTION OF THE DRAWINGS

In the following, the invention will be described in greater detail with reference to examples illustrated in the accompanying drawings, in which FIG. 1 generally shows a mobile telephone system and its users.

DETAILED DESCRIPTION OF THE INVENTION

Figure 1:
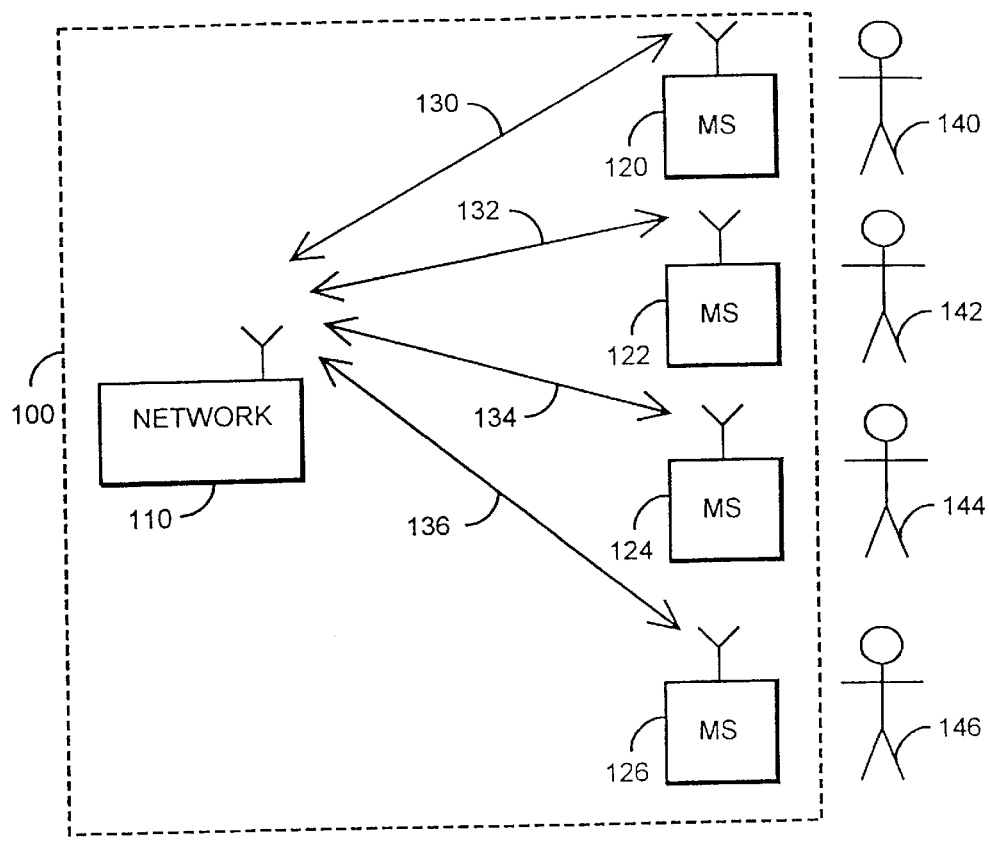

FIG. 1 generally shows a mobile telephone system of the invention. The mobile telephone system 100 comprises a network part 110, mobile station 120–126 and bidirectional radio link 130–136 between the network part 110 and mobile station 120–126.

According to the invention, the grade of service is divided into service classes according to the grade of service guaranteed by the mobile telephone system 100 to a user 140–146 of a mobile station 120–126 on the basis of the conditions of the mobile telephone system 100. The service classes comprise e.g. speech, data transmission, high-rate data transmission and video. As parameters the method employs preselected variables representing features of the mobile telephone system 100 and its use.

If the conditions of the mobile telephone system 100 allow several different service classes, the user 140–146 selects the one which is the most economical and suitable for him.

The transmission capacity available per a user 140–146 of a mobile station 120–126 functions as the determining variable in a service class. The use of the network part is optimized in such a way that the transmission method employed in the bidirectional radio link 130–136 changes according to the features of a service class.

Another way of optimizing the use of the network part is to check how much transmission capacity the network part 110 has available when a new user 146 tries to establish a new bidirectional radio link 136 between a new mobile station 126 and the network part 110. If the amount of available transmission capacity is sufficient, the new user 146 will be assigned a bidirectional radio link 136 according to his service class. If the amount of available transmission capacity is insufficient, it will be checked whether one of the users 140–144 is underutilizing his service class, i.e. does not use the entire transmission capacity available to him. If that is the case, the service class of the user 140–144 in question will be lowered, i.e. the service class is changed to correspond to the transmission capacity utilized by the user 140–144 in question. This allows part of transmission capacity to be released. The release of transmission capacity is repeated with as many users 140–144 as necessary and possible in order to release a sufficient amount of transmission capacity for the new user 146. If it is possible to release a sufficient amount of transmission capacity, the new user 146 will be assigned a bidirectional radio link 136 according to his service class. If a sufficient amount of transmission capacity cannot be released, then the total transmission capacity of the network part 110 is in use, and the new user 146 will not be assigned a bidirectional radio link 136.

Figure 2:
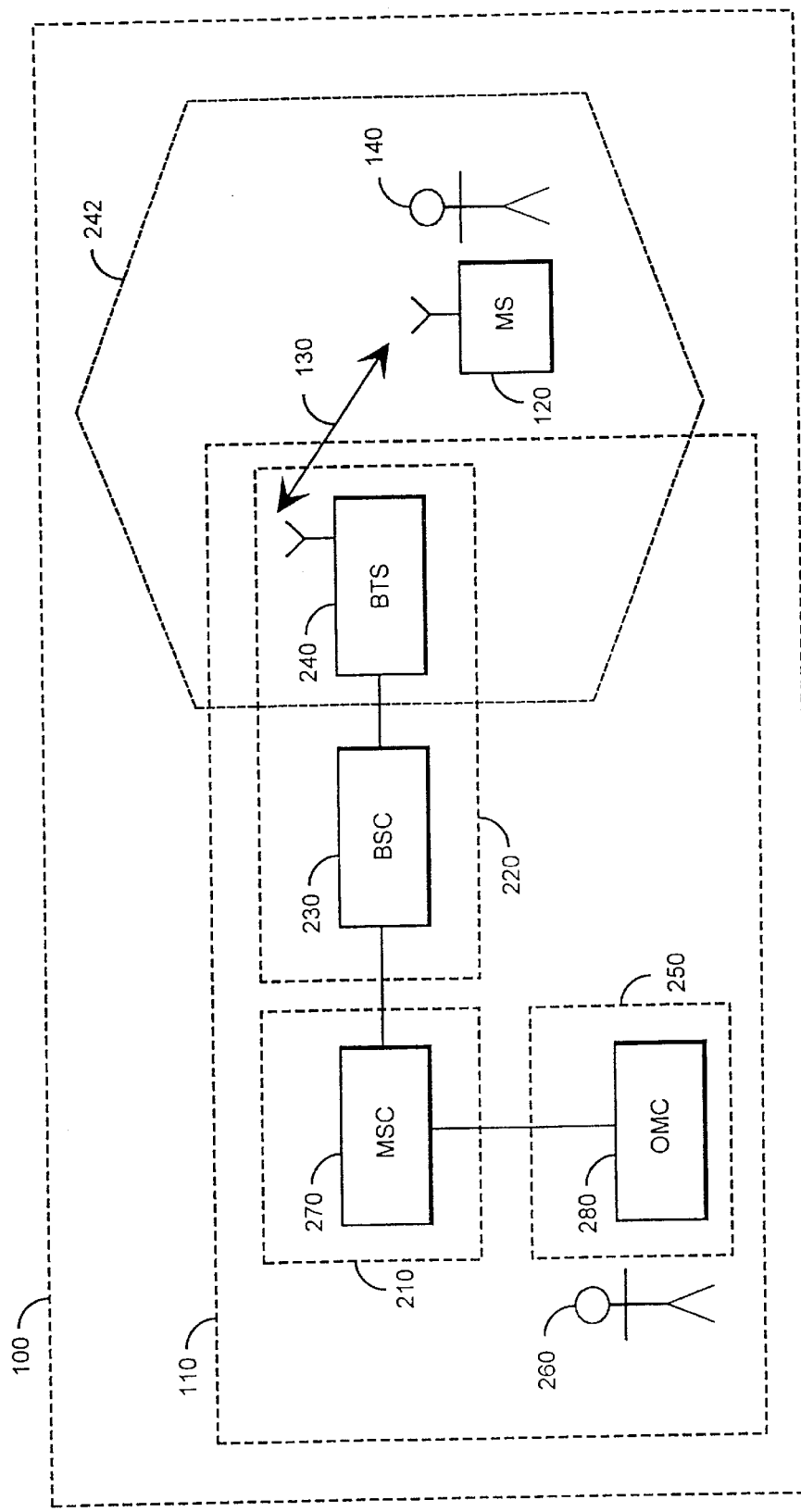
FIG. 2 shows the essential parts of the mobile telephone system in greater detail.

FIG. 2 shows the structure of the network part in greater detail. The network part 110 comprises at least one network management system 250, at least one network system 210 and at least one base station system 220. The network management system 250 is utilized for using, controlling and maintaining different functions of the mobile telephone system. The network operator receives information on the quality of functions and services provided through the network management system 250. The network management system comprises at least one operation and maintenance centre 280. The network operator adjusts different parameters of the mobile telephone system through the operation and maintenance centre 280, thus controlling its operation. The main task of the network system 210 is call control; therefore it comprises a mobile switching centre 270. The base station system 220 is responsible for controlling the radio path and comprises at least one base station controller 230 and at least one base station 240. The base station 240 has a coverage area, i.e. cell 242. The parameters of the method are the velocity of the mobile station 120 with respect to the base station 240, the distance of the mobile station 120 from the base station 240, the load of the mobile telephone system 100 and the cell 242 type of the base station 240 providing the bidirectional radio link 130.

The parameter of velocity is examined as the absolute velocity, the parameter of distance in proportion to the cell size of the base station 240, the parameter of load in proportion to the total capacity of the cell 242 and the parameter of cell type by utilizing existing hierarchical structures.

The efficiency of calculation can be increased in such a manner that each parameter has only a small number of different values, e.g. three. On the other hand, if the grade of service is to be determined accurately, each parameter is given a sliding value from the minimum to the maximum. If the efficiency and accuracy of calculation are to be optimized, some parameters have only a small number of different values, e.g. three, whereas other parameters are given a sliding value from the minimum to the maximum.

Each service class is represented by a different state in a state machine, in which transitions from one state to another are defined by calculation of parameters. The weighted average of the parameters is calculated, and it is checked which transition condition is fulfilled at any given time. The administrator 260 of the network part 110 of the mobile telephone system 100, i.e. a person belonging to the operating personnel of the network operator, determines the weighting coefficients used in the calculation for the parameters by means of the network management system 250, whereby different parameters have different significance when the service class is determined. In that case change of even a single parameter causes change of the service class. This makes the optimization of the use of the network part 110 easier, since there can be different combinations of weighting coefficients for different situations, such methods are known as adaptive methods.

Figure 3:
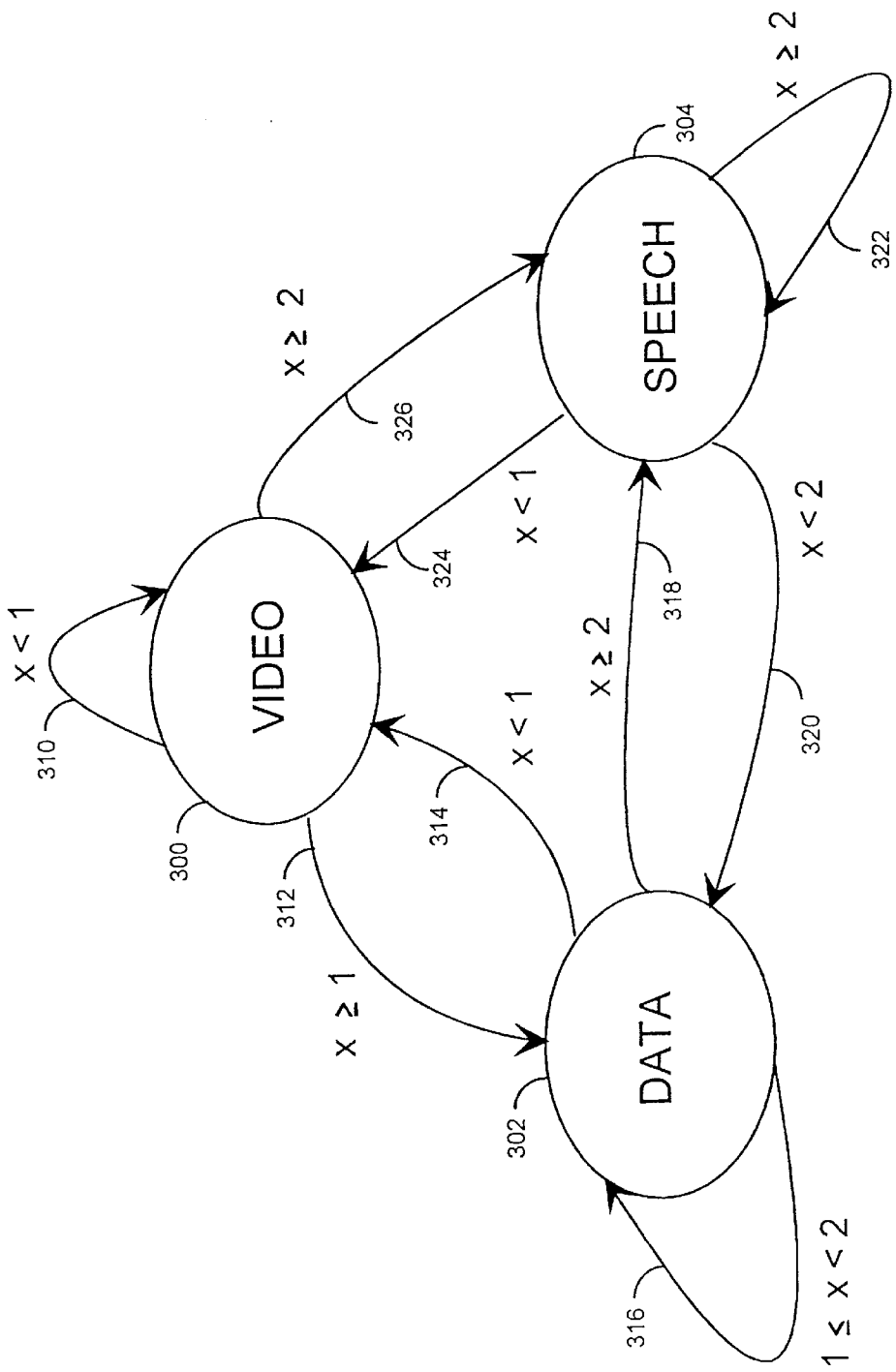
FIG. 3 shows a state transition chart according to the invention by way of example.

FIG. 3 illustrates, by way of example, a state transition chart according to the method. The states of the state machine are, for example, video 300, data 302 and speech 304. Two inequalities are deduced from the state transition chart, $\frac{1}{4}(a1V+a2R+a3L+a4C)>1$ and $\frac{1}{4}(b1V+b2R+b3L+b4C)>2$. Three different classes, 0, 1 and 2, are determined for each parameter, velocity V, distance R, load L and cell type C. Parameters a1–a4 and b1–b4 are weighted coefficients which can be freely defined by the network administrator. It is assumed that at the beginning the state is optimal, i.e. the video state 300. The inequalities are solved at regular intervals or for some specific reason. If the result is less than one 310, the same state remains. If the result is more than or equal to one 312, transition takes place to a worse data state 302, in which it is no longer possible to provide transmission services of video pictures for users. If the result is more than or equal to two, transition takes place directly to the worst state, i.e. conversation state 304, in which only transmission of speech is possible. The inequalities will be solved similarly in the data state 302. If the result is less than one 314, transmission takes place to the video state. If the result is more than or equal to one but less than two 316, the data state remains. If the result is more than or equal to two 318, transition takes place to the conversation state. The inequalities will be solved similarly in the conversation state 304. If the result is less than two 320, transition takes place to the data state. If the result is more than or equal to two 322, the conversation state remains. If the result is less than one 324, transition takes place to the video state.

Figure 4:
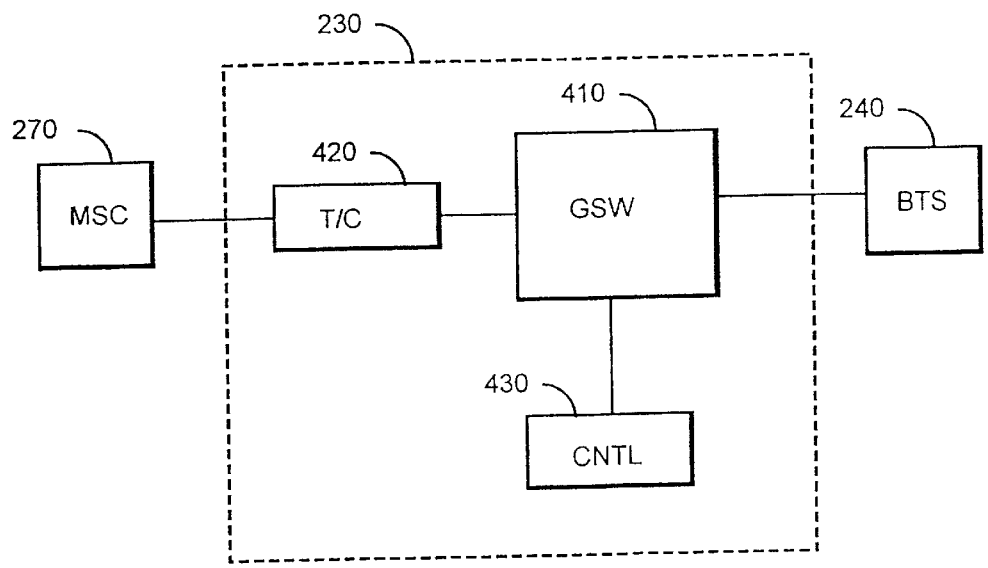
FIG. 4 shows the essential parts of a base station controller.

The network part 110 is arranged to carry out the processing of parameters that is needed for determining the grade of service. For example, the base station controller 230 in the network system 210 is arranged to perform the functions according to the method. FIG. 4 shows a simplified structure of the base station controller 230. The base station controller 230 comprises a group switching field 410, transcoder 420 and control unit 430. The group switching field 410 is used for switching speech and data and for connecting signalling circuits. The transcoder 420 converts different digital speech coding forms used between the public switched telephone network and mobile telephone network so as to make them compatible. The control unit 430 carries out call control, mobility management, collection of statistics and signalling (Air Interface Signalling and A Interface Signalling). The simplest way of implementing the invention is to provide the control unit 430 with software which in addition to its standard operations can determine the service class for each radio link 130–136 according to the method and signal the service class in question to the mobile station 120–126 via the base station 240. The above-mentioned functions can be realized e.g. with a general or signal processor or with separate logic. The mobile switching centre 270 or the base station 240 can also be arranged to perform the functions of the method. It will be obvious to one skilled in the art how the devices in question are to be arranged to use the method of the invention. It will also be obvious to him that other elements of the network part 110 not mentioned herein can also be arranged to perform the functions of the method.

Figure 5:
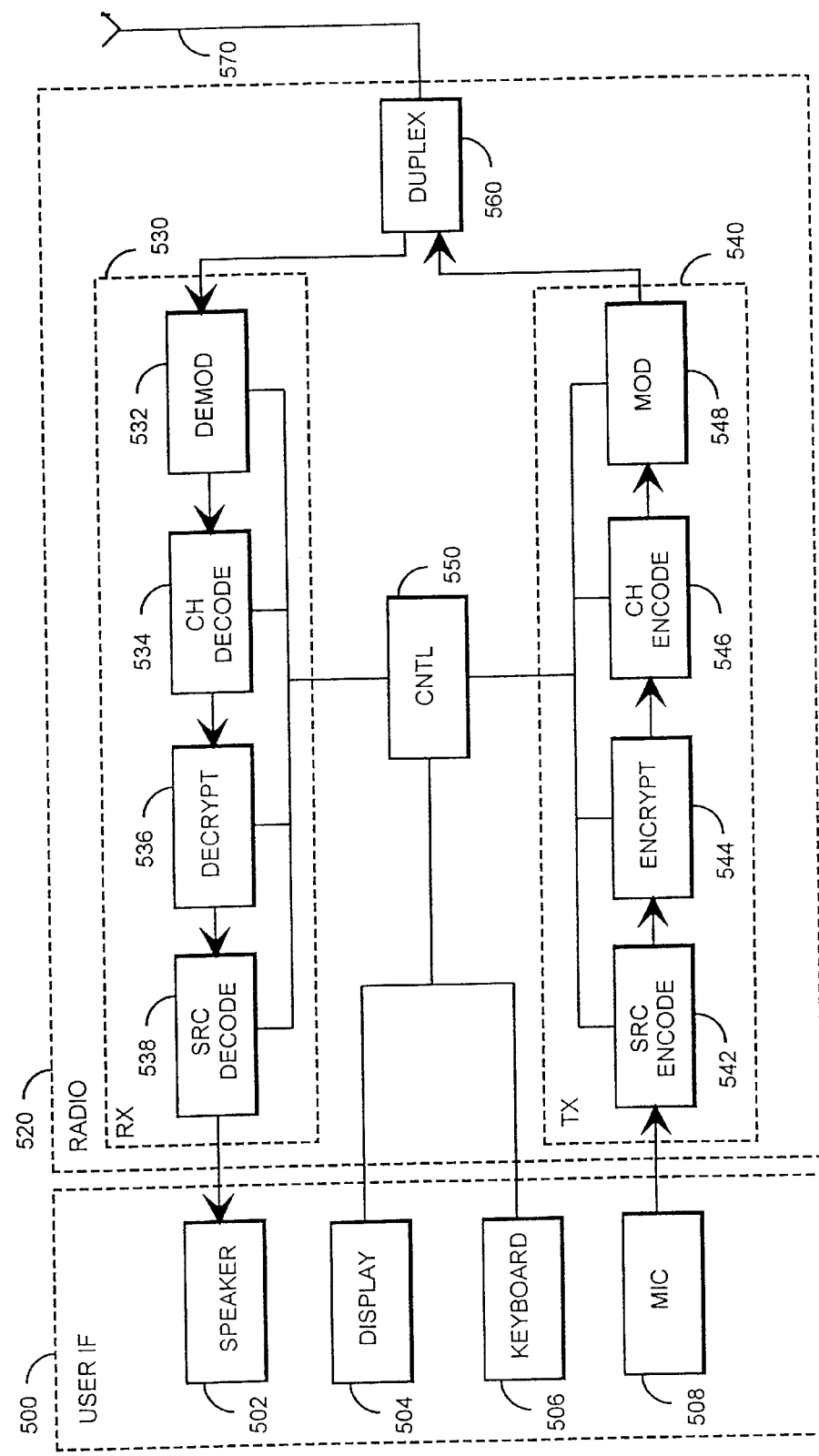
FIG. 5 shows the essential parts of a mobile station.

The mobile station 120–126 is arranged to receive the grade of service from the network part 110. FIG. 5 shows a simplified structure of the mobile station. The mobile station comprises a user part 500, radio part 520 and antenna 570. The user part 500 functions as the user interface of the mobile station for the user 140–146. The radio part 520 converts the signal to be transmitted into a form suitable for the radio link 130–136 and the received signal into a form understandable to the user 140–146. The antenna 570 receives a signal from the radio link 130–136 and sends a signal to the radio link 130–136. The user part 500 comprises a speaker 502, display 504, keyboard 506 and microphone 508. The radio part 520 comprises a receiver 530, transmitter 540, control unit 550 and duplex filter 560. The receiver 530 comprises a demodulator 532, channel decoder 534, decrypter 536 and source decoder 538. The transmitter comprises a source coder 542, encrypter 544, channel coder 546 and modulator 548. The signal is received by the antenna 570, from which it continues to the receiver 530 through the duplex filter 560. First, the signal is demodulated in the demodulator 534. Then it is decoded in the channel decoder 534. Next, the decryption is performed in the decrypter 536. Finally, the received information is converted into an presentable form in the source decoder 538, after which the speech information is transmitted to the speaker 502 and the signalling transmitted from the base station is processed in the control unit 550. When the information to be transmitted reaches the transmitter 540 from the microphone 508 and control unit 550, the speech information is digitized and code words are generated from the digitized speech information and signalling in the source coder 542, after which encryption is carried out in the encrypter 544. Then the information to be transmitted is coded in the channel coder 546, after which it is modulated in the modulator 548. Finally, the information to be transmitted is supplied through the duplex filter 560 to the antenna 570. The essential idea of the invention is that the control unit 550 controls those units with which it has a connection in the figure. The simplest way of implementing the invention is to provide the control unit 550 with software which in addition to its standard operations is capable of interpreting signalling received from the base station via the source decoder 538. The mobile station 120–126 is arranged to indicate the grade of service to the user 140–146 in a clear form. Thus the service class is indicated to the user in an understandable form, e.g. as a text, picture, tone or in some other manner known from the prior art. At its simplest the control unit 550 has software which controls the display 504 to indicate the grade of service in a clear form. In addition to the service class, the user also receives more specific information on the grade of service, e.g. the transmission speed, transmission method, error correction method, charging related to the service class or other information concerning the use. The mobile station 120–126 is arranged to provide the user 140–146 with the possibility of selecting the grade of service that is the most economical and suitable for him. At its simplest the control unit 550 has software which receives the grade of service selected by the user 140–146 by means of his keyboard 506. The functions described above can be implemented e.g. with general or signal processors or with separate logic.

Although the invention has been described above by means of an example illustrated in the accompanying drawings, it will be obvious that the invention is not limited to it, but may be modified in several ways within the inventive concept disclosed in the appended claims.

What is claimed is:

1. A method of providing service for a mobile station of a mobile telephone system, the method comprising:

a network part of the mobile telephone system determining a grade of service guaranteed to a mobile station based on conditions of the mobile telephone system, the conditions including transmission capacity and representing features of the mobile telephone system and its use;

the network part assigning, at least one service class for the mobile station based on the determined grade of service; and the network part assigning, for the mobile station, a bidirectional radio link to the network part according to the assigned service class.

2. The method of claim 1, further comprising the network part detecting the conditions of the mobile telephone system.

3. The method of claim 1, wherein the network part assigns at least two service classes for the mobile station based on grade of service and the mobile station selects one of the at least two assigned service classes.

4. The method of claim 1, wherein the service class is one of speech, data transmission, high-rate data transmission, and video.

5. The method of claim 1, further comprising changing a transmission method used in the bidirectional radio link according to features of the service class.

6. The method of claim 1, wherein the network part includes at least one base station which has a coverage area that is a cell, and the pre-selected variable is at least one of velocity of the mobile station with respect to the base station, the distance of the mobile station from the base station, the load of the mobile telephone system, and the cell type of the base station providing the bidirectional radio link.

7. The method of claim 6, further comprising examining the velocity of the mobile station as the absolute velocity, the distance in proportion to the cell size of the base station, the load in proportion to the total capacity of the cell, and the cell type by employing existing hierarchical structures.

8. The method of claim 1, wherein the pre-selected variable has only a small number of different values.

9. The method of claim 1, further comprising giving each parameter a sliding value from a minimum to a maximum.

10. The method of claim 1, further comprising representing each service class by a different state in a state machine, in which transitions from one state to another are defined by calculation of pre-selected variables.

11. The method of claim 10, further comprising calculating a weighted average of pre-selected variables, and checking which transition condition is fulfilled at any given time.

12. The method of claim 10, further comprising defining weighting coefficients to be used in the calculation of the pre-selected variables by an administrator of the network part.

13. The method of claim 10, further comprising using adaptive methods in the calculation of the pre-selected variables, which adaptive methods change the weighting coefficients to correspond to the mobile telephone system conditions at any given time.

14. The method of claim 1, further comprising:
checking transmission capacity if a new mobile station attempts to establish a new bidirectional radio link to the network part;
if an amount of available transmission capacity is insufficient, checking whether some mobile station is underutilizing its service class by not using its entire available transmission capacity; and
if some mobile station is underutilizing its service class, lowering the service class of the mobile station in question such that the service class is changed to correspond to the transmission capacity utilized by the mobile station in question, thereby releasing transmission capacity, and if there are no mobile stations underutilizing their service class or their number is insufficient, the new mobile station is not assigned a bidirectional radio link;
assigning the new mobile station a bidirectional radio link according to its service class;
wherein checking and lowering of a mobile station's transmission capacity is repeated with as many mobile stations as necessary and possible until there is a sufficient amount of transmission capacity available for the new mobile station.

15. A method of determining a grade of service provided for a mobile station by a mobile telephone system including a network part, a mobile station and a bidirectional radio link between the network part and the mobile station, the method comprising:
assigning a service class for each mobile station based on a grade of service guaranteed by the mobile telephone system to the user on the conditions of the mobile telephone system;
checking transmission capacity if a new mobile station attempts to establish a new bidirectional radio link to the network part;
if an amount of available transmission capacity is insufficient to establish the new bidirectional radio link, checking whether some mobile station is underutilizing its service class by not using its entire available transmission capacity; and
if some mobile station is underutilizing its service class, lowering the service class of the mobile station in question such that the service class is changed to correspond to the transmission capacity utilized by the mobile station in question, thereby releasing transmission capacity; and
if there are no mobile stations underutilizing their service class or their number is insufficient, the new mobile station is not assigned a bidirectional radio link;
assigning the new mobile station a bidirectional radio link according to its service class;
wherein checking and lowering of a mobile station's transmission capacity is repeated with as many mobile stations as necessary and possible until there is a sufficient amount of transmission capacity available for the new mobile station.

16. A method of determining a grade of service provided for a mobile station by a mobile telephone system including a network part, a mobile station and a bidirectional radio link between a base station of the network part:and the mobile station, the method comprising:
assigning a service class for the mobile station based on a grade of service guaranteed by the mobile telephone system to a user of the mobile station based on conditions of the mobile telephone system; and
determining the grade of service guaranteed by the mobile telephone system to the mobile station using at least one pre-selected variable representing features of the mobile telephone system and its use, wherein the pre-selected variable is at least one of velocity of the mobile station with respect to the base station, the distance of the mobile station from the base station, the load of the mobile telephone system, and the cell type of the base station.

17. A mobile telephone system, comprising:
at least one mobile station; and
a network part configured to:
determine a grade of service guaranteed to the mobile station based on the conditions of the mobile telephone system, the conditions including transmission capacity and representing features of the mobile telephone system and its use;
assign at least one service class for the mobile station based on the determined grade of service; and
assign for the mobile station a bidirectional radio link to the network part according to the assigned service class.

18. The system of claim 17, wherein the network part is configured to detect the conditions of the mobile telephone system.

19. The system of claim 17, wherein the network part assigns at least two service classes for the mobile station based on grade of service and wherein the mobile station is configured to select one of the at least two assigned service classes.

20. The system of claim 17, wherein the service class is one of speech, data transmission, high-rate data transmission, and video.

21. The system of claim 17, wherein the network part is configured to change the transmission method used in the bidirectional radio link according to features of the service class.

22. The system of claim 17, wherein the network part includes at least one base station which has a coverage area that is a cell, and the pre-selected variable is at least one of velocity of the mobile station with respect to the base station, the distance of the mobile station from the base station, the load of the mobile telephone system, and the cell type of the base station providing the bidirectional radio link.

23. The system of claim 22, wherein the network part is configured to examine the velocity of the mobile station as the absolute velocity, the distance in proportion to the cell size of the base station, the load in proportion to the total capacity of the cell, and the cell type by employing existing hierarchical structures.

24. The system of claim 17, wherein the pre-selected variable has only a small number of different values.

25. The system of claim 17, wherein the network part is configured to give each parameter a sliding value from a minimum to a maximum.

26. The system of claim 17, wherein the network part is configured to represent each service class by a different state in a state machine, in which transitions from one state to another are defined by calculation of the pre-selected variables.

27. The system of claim 26, wherein the network part is configured to calculate a weighted average of the pre-selected variables, and check which transition condition is fulfilled at any given time.

28. The system of claim 26, wherein the network part is configured to receive weighting coefficients to be used in the calculation of the pre-selected variables from an administrator of the network part.

29. The system of claim 26, wherein the network part is configured to use adaptive methods in the calculation of the pre-selected variable, which adaptive methods change the weighting coefficients to correspond to the conditions of the mobile telephone system at any given time.

30. The system of claim 17, wherein the network part is configured to check transmission capacity if a new mobile station attempts to establish a new bidirectional radio link to the network part;
- if the amount of available transmission capacity is insufficient to establish a new bidirectional radio link to the network part, to check whether some mobile station is underutilizing its service class by not using its entire available transmission capacity; and
- if some mobile station is underutilizing its service class, to lower the service class of the mobile station in question such that the service class is changed to correspond to the transmission capacity utilized by the mobile station in question, thereby releasing transmission capacity, and if there are no mobile stations underutilizing their service class or their number is insufficient, the new mobile station is not assigned a bidirectional radio link;
- to assign the new mobile station a bidirectional radio link according to its service class;
- wherein checking and lowering of a mobile station's transmission capacity is repeated with as many mobile stations as necessary and possible until there is a sufficient amount of transmission capacity available for the new mobile station.

31. A mobile telephone system, comprising:
a mobile station; and
a network part configured to:
- assign a service class for each mobile station based on a grade of service guaranteed by the mobile telephone system to the user on the conditions of the mobile telephone system;
- check transmission capacity if a new mobile station tries to establish a new bidirectional radio link to the network part;
- check whether some mobile station is underutilizing its service class by not using its entire available transmission capacity if the amount of available transmission capacity is insufficient; and
- lower the service class of the mobile station in question such that the service class is changed to correspond to the transmission capacity utilized by the mobile station in question if some mobile station is underutilizing its service class, thereby releasing transmission capacity; and
- not assigning the new mobile station a bidirectional radio link if there are no mobile stations underutilizing their service class or their number is insufficient;
- assign the new mobile station a bidirectional radio link according to its service class;
- wherein checking and lowering mobile station's transmission capacity is repeated with as many mobile stations as necessary and possible until there is a sufficient amount of transmission capacity available for the new mobile station.

32. A mobile telephone system, comprising:
a mobile station; and
a network part is configured to:
- assign a service class for the mobile station based on the grade of service guaranteed by the mobile telephone system to the user on the conditions of the mobile telephone system; and
- determine the grade of service guaranteed by the mobile telephone system to the mobile station using pre-selected variables representing features of the mobile telephone system and its use, wherein the pre-selected variable is at least one of velocity of the mobile station with respect to the base station, the distance of the mobile station from the base station, the load of the mobile telephone system, and the cell type of the base station.

* * * * *